United States Patent
Onishi et al.

(10) Patent No.: US 11,446,806 B2
(45) Date of Patent: Sep. 20, 2022

(54) RECIPROCATING TOOL

(71) Applicant: KOKI HOLDINGS CO., LTD., Tokyo (JP)

(72) Inventors: Takaaki Onishi, Hitachinaka (JP); Toshihiko Tachibana, Hitachinaka (JP); Shogo Shibata, Hitachinaka (JP)

(73) Assignee: KOKI HOLDINGS CO., LTD., Tokyo (JP)

( * ) Notice: Subject to any disclaimer, the term of this patent is extended or adjusted under 35 U.S.C. 154(b) by 0 days.

(21) Appl. No.: 16/463,366

(22) PCT Filed: Oct. 27, 2017

(86) PCT No.: PCT/JP2017/038897
§ 371 (c)(1),
(2) Date: May 22, 2019

(87) PCT Pub. No.: WO2018/100941
PCT Pub. Date: Jun. 7, 2018

(65) Prior Publication Data
US 2019/0351539 A1    Nov. 21, 2019

(30) Foreign Application Priority Data

Nov. 30, 2016  (JP) .............................. JP2016-233152

(51) Int. Cl.
*B25F 5/00*    (2006.01)
*B23D 49/16*   (2006.01)
(Continued)

(52) U.S. Cl.
CPC ................ *B25F 5/00* (2013.01); *B23D 49/16* (2013.01); *B23D 51/16* (2013.01); *B27B 19/09* (2013.01)

(58) Field of Classification Search
CPC .......... B25F 5/00; B27B 19/09; B23D 59/006
See application file for complete search history.

(56) References Cited

U.S. PATENT DOCUMENTS 2,722,244 A * 11/1955 Schultz .................. B23D 51/10
                                                    30/394
3,204,470 A *  9/1965 Brucker ............... B23D 49/165
                                                    74/50
(Continued)

FOREIGN PATENT DOCUMENTS

CN    103379867 A    10/2013
CN    203263480 U    11/2013
(Continued)

OTHER PUBLICATIONS

International Search Report and Written Opinion dated Dec. 19, 2017 by the International Searching Authority (Japan Patent Office) in PCT Application PCT/JP2017/038897 (English Translation of the ISR).

(Continued)

*Primary Examiner* — Sean M Michalski
(74) *Attorney, Agent, or Firm* — NovoTechIP International PLLC (57) ABSTRACT

A reciprocating tool includes: a motor; a gear case; a converting mechanism; a plunger; a sealing member; and an auxiliary sealing member. The converting mechanism is accommodated in the gear case and configured to convert rotating motion of the motor into reciprocating movement in a predetermined direction. The plunger is provided with a mounting portion on which an end bit is mountable, and is reciprocally movably supported to the gear case. The plunger is driven by the converting mechanism to reciprocally move in the predetermined direction. The plunger is reciprocally movably inserted into the sealing member in the predetermined direction. The sealing member is supported by the gear case. The auxiliary sealing member is supported by the sealing member and sealing an outer peripheral surface of the plunger.

16 Claims, 6 Drawing Sheets

(51) Int. Cl.
*B23D 51/16* (2006.01)
*B27B 19/09* (2006.01)

(56) References Cited

U.S. PATENT DOCUMENTS

| | | | | |
|---|---|---|---|---|
| 3,945,120 | A * | 3/1976 | Ritz | B23D 49/165 30/393 |
| 4,385,443 | A | 5/1983 | O'Banion | |
| 4,562,780 | A * | 1/1986 | Leiblich | A01C 5/064 111/164 |
| 4,976,164 | A * | 12/1990 | Lentino | B23D 51/02 30/393 |
| 5,241,888 | A * | 9/1993 | Chen | B23D 45/046 83/471.3 |
| 5,392,519 | A * | 2/1995 | Inoue | B23D 49/165 30/272.1 |
| 6,006,435 | A * | 12/1999 | Chien | B23D 51/18 30/277.4 |
| 6,173,500 | B1 * | 1/2001 | Feldmann | B23D 51/00 173/DIG. 2 |
| 6,226,877 | B1 * | 5/2001 | Ono | B23D 49/162 30/392 |
| 6,471,211 | B1 * | 10/2002 | Garnett | F16C 19/34 277/351 |
| 6,810,589 | B2 * | 11/2004 | Lagaly | B23D 49/162 24/50 |
| 7,225,546 | B2 * | 6/2007 | Hartmann | B23D 49/165 30/393 |
| 7,937,841 | B2 * | 5/2011 | Ohlendorf | B23D 59/006 30/392 |
| 2004/0181952 | A1 * | 9/2004 | Hartmann | B23D 51/02 30/392 |
| 2005/0132583 | A1 * | 6/2005 | Bednar | B23D 49/165 30/392 |
| 2008/0041174 | A1 | 2/2008 | Lagaly et al. | |
| 2008/0289196 | A1 * | 11/2008 | Ohlendorf | B23D 59/006 30/392 |
| 2011/0107608 | A1 * | 5/2011 | Wattenbach | B23D 49/165 30/394 |
| 2013/0227845 | A1 * | 9/2013 | Fujiwara | B23D 49/162 30/394 |
| 2013/0289565 | A1 | 10/2013 | Hassler, Jr. | |
| 2015/0130330 | A1 * | 5/2015 | Nagy | H01H 51/27 310/68 C |

FOREIGN PATENT DOCUMENTS

| | | |
|---|---|---|
| CN | 203963466 U | 11/2014 |
| CN | 104703738 A | 6/2015 |
| JP | S57151489 U | 9/1981 |
| JP | H11320456 A | 11/1999 |
| JP | 2000117535 A | 4/2000 |
| JP | 2013180382 A | 9/2013 |
| WO | 2014056747 A2 | 4/2014 |

OTHER PUBLICATIONS

International Preliminary Report on Patentability issued in International Application No. PCT/JP2017/038897, dated Jun. 4, 2019.
Office Action dated Sep. 2, 2021 in corresponding Chineses patent application No. 201780073526.4 (English language translation provided).

* cited by examiner

RECIPROCATING TOOL

TECHNICAL FIELD

The present invention relates to a reciprocating tool configured to reciprocate a plunger.

BACKGROUND ART

Conventionally, there has been known a reciprocating tool such as a saber saw configured to perform a cutting operation by reciprocally moving a plunger provided with an end bit such as a blade. For example, in a saber saw disclosed in Patent Literature 1 described below, a plunger is reciprocally supported by a bearing unit provided in a gear case. The gear case also accommodates therein a converting mechanism, such as gears to convert a rotation of a motor into a reciprocating movement of the plunger in its axial direction. A blade is mounted at a tip end of the plunger, and the blade protrudes outward through an opening formed in a front portion of the gear case. In accordance with the rotation of the motor, the blade reciprocates along with the plunger, and an operation of cutting a workpiece, such as wood, steel member, and a pipe, is performed.

CITATION LIST

Patent Literature

[Patent Literature 1] Japanese Patent Application Publication No. 2013-180382

SUMMARY OF INVENTION

Technical Problem

This type of reciprocating tool incurs problem in that dust produced in a cutting operation enters a gear case through a space between the gear case and a plunger or dust is adhered on the plunger to enter the gear case. In addition, cutting an overhead water service pipe from its lower side incurs problem in that liquid, such as water, enters the gear case through a space between the gear case and the plunger or by running down the plunger.

In view of the foregoing, it is an object of the present invention to provide a reciprocating tool capable of ensuring dustproof property and waterproof property with respect to an interior of a gear case.

Solution to Problem

In order to attain the above and other objects, the present invention provides a reciprocating tool including: a motor; a gear case; a converting mechanism; a plunger; and a sealing member. The gear case includes: a first gear case; and a second gear case in confrontation with the first gear case. The converting mechanism is accommodated in the gear case and is configured to convert rotating motion of the motor into reciprocating movement in a predetermined direction. The plunger is provided with a mounting portion on which an end bit is mountable, and is reciprocally movably supported to the gear case. The plunger is driven by the converting mechanism to reciprocally move in the predetermined direction. The plunger is reciprocally movably inserted in the predetermined direction in the sealing member. The sealing member is nipped between the first gear case and the second gear case, and seals an outer peripheral surface of the plunger.

With this structure, entry of dust particles and liquid into an interior of the gear case through a gap between the plunger and the gear case or along the plunger can be restrained, since the outer peripheral surface of the plunger is sealed by the sealing member. Accordingly, dustproof performance and waterproof performance of the tool can be enhanced. Further, increase in numbers of parts and components and an increase in assembling steps can be restrained, since the sealing member can be fixed to the gear case by nipping the sealing member between the first gear case and the second gear case without employments of discrete components. Hence, the resultant tool provided with dustproof and waterproof performance can be provided at low cost, and a compact tool can be provided.

The above-described reciprocating tool preferably further includes a bearing portion positioned in the gear case and configured to support the plunger reciprocally movably in the predetermined direction, and the sealing member is positioned between the mounting portion and the bearing portion in the predetermined direction.

With this structure, dustproof and waterproof performance with respect to a space inward of the bearing portion in the gear case can be secured, since the sealing member is positioned closer to the end bit than the bearing portion is to the end bit.

Preferably, the sealing member includes an inclined portion inclined with respect to a confronting direction between the first gear case and the second gear case.

Further, the inclined portion preferably includes a first inclined portion and a second inclined portion. The first inclined portion is positioned closer to the first gear case than the second inclined portion is to the first gear case and has a tapered shape in a direction from the second gear case toward the first gear case. The second inclined portion is positioned closer to the second gear case than the first inclined portion is to the second gear case and has a tapered shape in a direction from the first gear case toward the second gear case.

With this structure, since the sealing member is tapered toward the first gear case and the second gear case, the interposing of the sealing member between the first gear case and the second gear case can be facilitated during assembly of the tool, and sealing to the outer peripheral surface of the plunger by the sealing member can be improved. Hence, assembling efficiency can be improved and dustproof and waterproof performance can be enhanced.

Preferably, the sealing member includes a main body portion, a first auxiliary sealing member, and a second auxiliary sealing member. The first auxiliary sealing member is positioned closer to the mounting portion than the main body portion is to the mounting portion in the predetermined direction, and the second auxiliary sealing member is positioned closer to the bearing portion than the main body portion is to the bearing portion in the predetermined direction. The main body portion is nipped between the first gear case and the second gear case.

With this structure, entry of dust particles and the like through the gap between the plunger and the gear case can be restrained by the main body portion interposed between the first gear case and the second gear case, and the entry of the dust particles along the plunger can be restrained by the first auxiliary sealing member and the second auxiliary sealing member each positioned at each side of the main body portion. Accordingly, waterproof and dustproof performance can be securely improved.

Preferably, the main body portion includes a first support portion supporting the first auxiliary sealing member, and a second support portion supporting the second auxiliary sealing member.

With this structure, the main body portion, the first auxiliary sealing member, and the second auxiliary sealing member can be integrally assembled together, thereby improving assembling efficiency.

Preferably, in the reciprocating tool described above, the main body portion has one surface facing the mounting portion, and another surface facing the bearing portion, and the first support portion is a first groove portion formed in the one surface, and the second support portion is a second groove portion formed in the another surface. The first auxiliary sealing member is positioned in the first groove portion, and the second auxiliary sealing member is positioned in the second groove portion.

With this structure, a compact sealing member and a compact tool body can be attained, since the first auxiliary sealing member and the second auxiliary sealing member can be positioned within a widthwise dimension in the predetermined direction of the main body portion.

Preferably, in the reciprocating tool described above, the first auxiliary sealing member is annular in shape and formed of felt.

With this structure, even in a case where powders having high temperature due to cutting operation is adhered to the sealing member, degradation of the sealing member can be restrained, since the felt is positioned relative to the main body portion to face the mounting portion. Further, oil can be impregnated into the felt. Thus, enhanced slidability of the plunger relative to the sealing member can be obtained.

Further, the second auxiliary sealing member is preferably an annular elastic member.

With this structure, sealability at the outer peripheral surface of the plunger can be improved blocking entry of particles and the like and leakage of oil and liquid from the interior of the tool can be restrained, since the elastic member is positioned relative to the main body portion of the sealing member to face the bearing portion.

Advantageous Effects of Invention

In the reciprocating tool according to the present invention, waterproof and dustproof performance with respect to the interior of the tool can be securely attained because of sealing at the outer peripheral surface of the plunger by the sealing member.

BRIEF DESCRIPTION OF THE DRAWINGS

FIG. 6 is a view illustrating an elastic member, and (a) is a rear view, (b) is a right side view, and (c) is a front view.

FIG. 7 is a view illustrating the elastic member, and (a) is a cross-sectional view taken along the line A-A in FIGS. 6(a), and (b) is cross-sectional view taken along the line B-B in FIG. 7(a).

DESCRIPTION OF EMBODIMENTS

One embodiment according to the present invention will be described with reference to accompanying drawings. A saver saw is exemplified as the embodiment.

Figure 1:
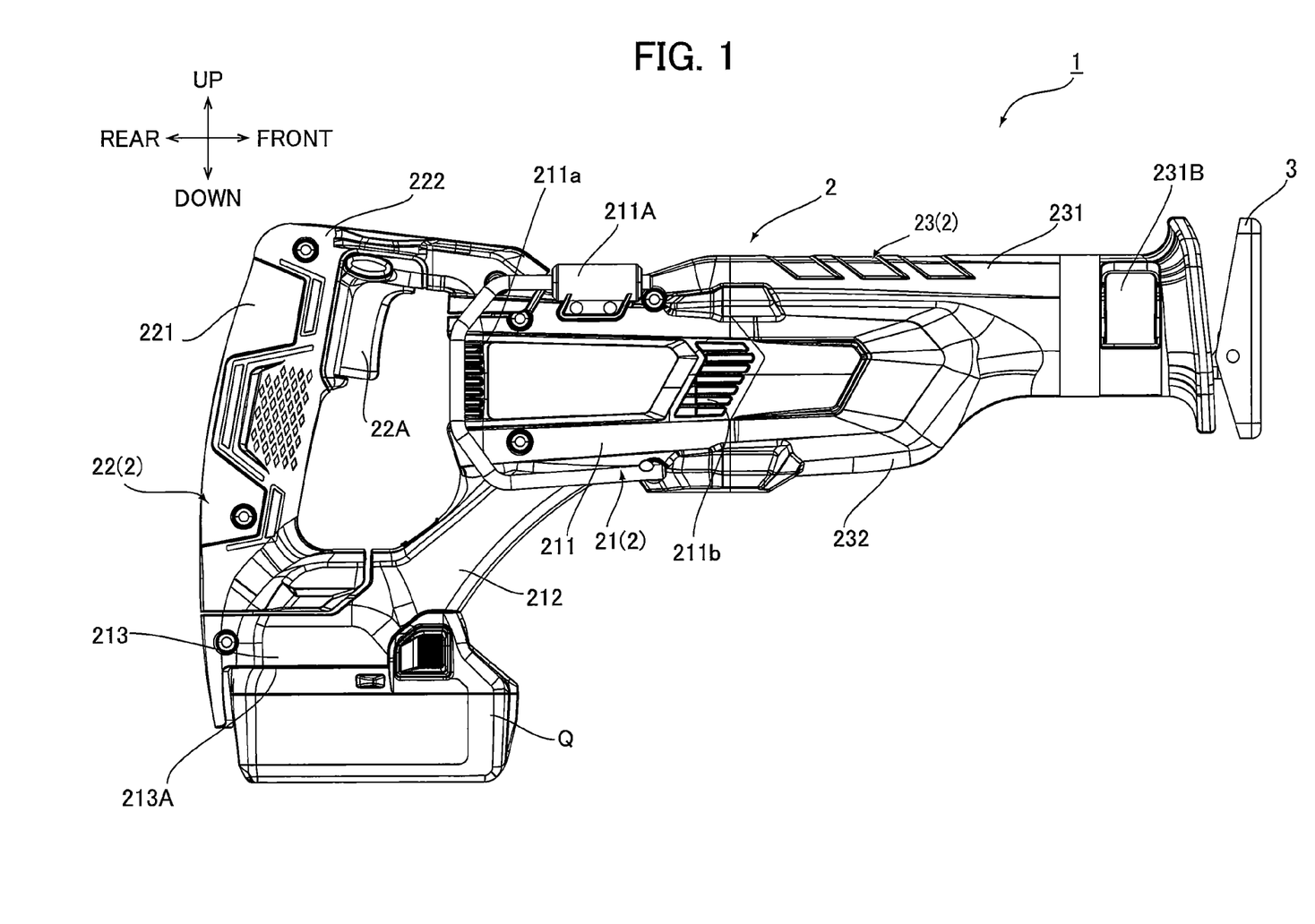
FIG. 1 is a right side view illustrating an external appearance of a saber saw according to one embodiment of the present invention, and illustrating a detached state of a blade.
Figure 2:
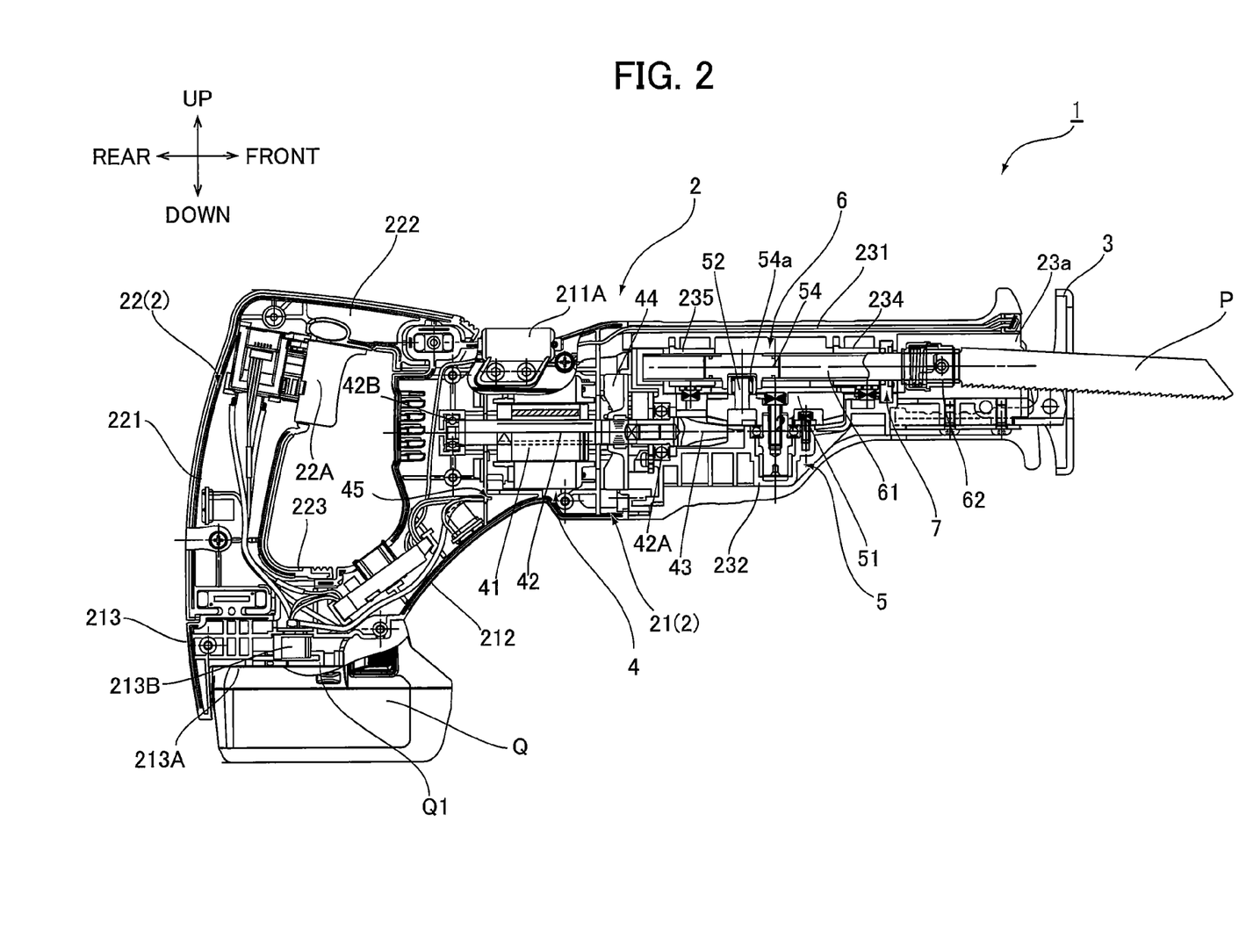
FIG. 2 is a cross-sectional side view illustrating an internal structure of the saber saw according to the embodiment, and illustrating attached state of the blade.
Figure 3:
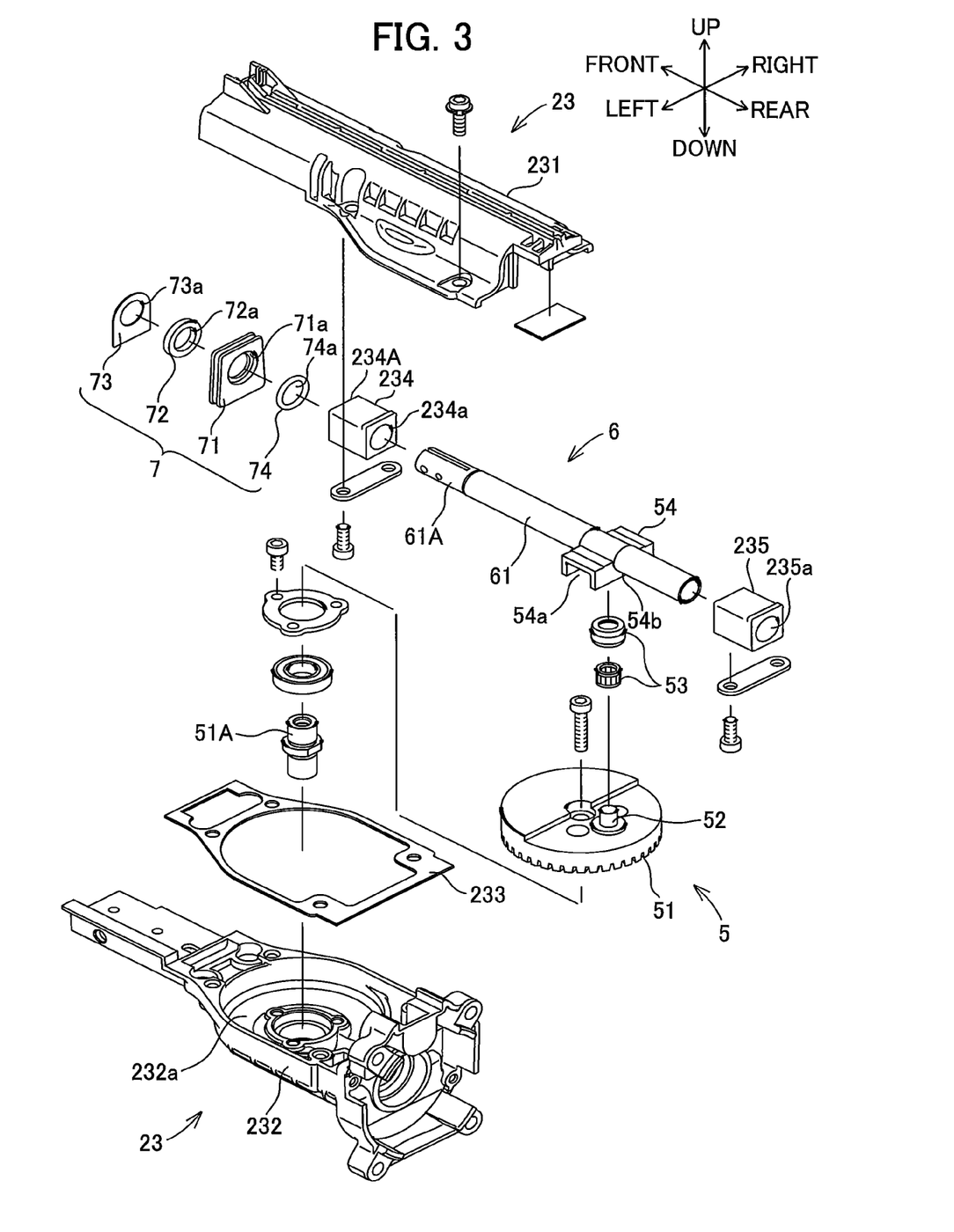
FIG. 3 is an exploded perspective view illustrating an essential portion of the saber saw according to the embodiment of the present invention.

First, a configuration of a saber saw according to the embodiment of the present invention will be described with reference to FIGS. 1 to 3. FIG. 1 is a right side view illustrating an external appearance of a saber saw 1 according to an embodiment of the present invention. FIG. 2 is a cross-sectional right side view illustrating an internal structure of the saber saw 1. FIG. 3 is an exploded perspective view illustrating an essential portion of the saber saw 1.

The saber saw 1 is an electric-powered reciprocating tool configured to cut a workpiece, such as wood, steel member, or a pipe. As illustrated in FIGS. 1 and 2, the saber saw 1 includes a housing 2, a base 3, a motor unit 4, a gear unit 5, a plunger 6, and a sealing member 7. A blade P is not mounted in FIG. 1, and the blade P is mounted in FIG. 2.

In the following description, "UP," "DOWN," "FRONT," and "REAR" indicated in FIG. 1 are defined as an upward direction, a downward direction, a frontward direction, and a rearward direction, respectively. In addition, "RIGHT" and "LEFT" indicated in the drawings are defined as rightward direction and leftward direction as viewed from the rear side of the saber saw. "Frontward/rearward direction" is an example of "predetermined direction" in the present invention. "Upward/downward direction" is an example of "confronting direction" in the present invention.

The housing 2 defines an outline of the saber saw 1. As illustrated in FIGS. 1 and 2, the housing 2 includes a motor housing 21, a handle housing 22, and a gear case 23.

The motor housing 21 and the handle housing 22 are made, for example, from resin. The motor housing 21 and the handle housing 22 are formed by complementary halves mating with each other at a parting plane (imaginary plane) passing through generally a center of the housing 2 in a leftward/rightward direction and orthogonal to the leftward/rightward direction. Split right and left portions of the motor housing 21 and the handle housing 22 are formed generally symmetric with each other relative to the parting plane.

As illustrated in FIGS. 1 and 2, the motor housing 21 includes a hollow cylindrical portion 211, a first extension portion 212, and a second extension portion 213.

As illustrated in FIG. 2, the hollow cylindrical portion 211 is generally hollow cylindrical extending in a frontward/rearward direction. The hollow cylindrical portion 211 is configured to house the motor unit 4. An intake port 211a is formed in a rear portion of the hollow cylindrical portion 211. A discharge port 211b is formed in a front portion of the hollow cylindrical portion 211. A hook 211A is provided on an upper portion of the hollow cylindrical portion 211 at a generally center portion in the frontward/rearward direction. The hook 211A is adapted to be hooked on a ladder and, a scaffold.

As illustrated in FIG. 2, the first extension portion 212 is generally hollow cylindrical extending rearward and diagonally downward from a lower end of the rear portion of the hollow cylindrical portion 211.

As illustrated in FIG. 2, the second extension portion 213 extends rearward from a rear end of the first extension portion 212. The second extension portion 213A has a lower end provided with a battery connector 213A to which a battery pack Q is connectable. As illustrated in FIG. 2, the battery connector 213A includes a battery connecting terminal 213B that is connected to a terminal Q1 of the battery pack Q when the battery pack Q is connected to the battery connector 213A.

As illustrated in FIGS. 1 and 2, the handle housing 22 is generally U-shaped in a side view. The handle housing 22 is located rearward of the motor housing 21. The handle housing 22 includes a holding portion 221, a first connecting portion 222, and a second connecting portion 223.

The holding portion 221 is to be held by an operator during operation. As illustrated in FIGS. 1 and 2, the holding portion 221 extends in an upward/downward direction. A trigger 22A is provided at an upper front portion of the holding portion 221. The trigger 22A can be manually operated to control energization and de-energization of the motor unit 4. The first connecting portion 222 extends frontward from an upper portion of the holding portion 221. The second connecting portion 223 extends frontward from a lower portion of the holding portion 221.

As illustrated in FIGS. 1 and 2, the gear case 23 extends frontward from a front end of the motor housing 21. The gear case 23 has generally a funnel-like shape whose diameter decreases gradually toward its front side. An opening 23a is formed at a front end portion of the gear case 23. The blade P, described later, can be exposed to an outside through the opening 23a.

In the saber saw 1 according to the present embodiment, as illustrated in FIG. 3, the gear case 23 is formed as a split case that is split along a parting plane (imaginary plane) orthogonal to the upward/downward direction. The gear case 23 includes an upper cover 231 as one of the complementary halves, and a gear cover 232 as remaining one of the complementary halves. The upper cover 231 and the gear cover 232 are examples of "first gear case" and "second gear case" in the present invention.

The gear case 23 is made from metal. As illustrated in FIG. 3, the gear case 23 is fixed while an oil sheet 233 is interposed along the parting face. The oil sheet 233 is made from resin in the present embodiment. The oil sheet 233 is provided to seal any gap of the parting face between the upper cover 231 and the gear cover 232. The oil sheet 233 is nipped between the upper cover 231 and the gear cover 232. This configuration prevents foreign object such as dust or liquid from entering the gear case 23 through the gap along the parting face, or prevents liquid such as oil filled in the gear case 23 from leaking out of the gear case 23. An outer peripheral surface of the gear case 23 is covered by a cover made from resin or the like.

As illustrated in FIGS. 2 and 3, the gear case 23 houses the gear unit 5 and the plunger 6.

As illustrated in FIG. 3, a groove 232a is formed in an inner wall of the gear cover 232 for receiving the gear unit 5. Inner walls of the upper cover 231 and the gear cover 232 include walls (not illustrated) for positioning two bearing metals 234 and 235, described later. The positions of the bearing metals 234 and 235 are fixed by the walls in the frontward/rearward direction and in the leftward/rightward direction, and the bearing metals 234, 235 are fixed by being nipped between the upper cover 231 and the gear cover 232. The bearing metal 234 is disposed frontward of the bearing metal 235 in the frontward/rearward direction. The bearing metals 234, 235 are an example of "bearing portion".

Figure 4:
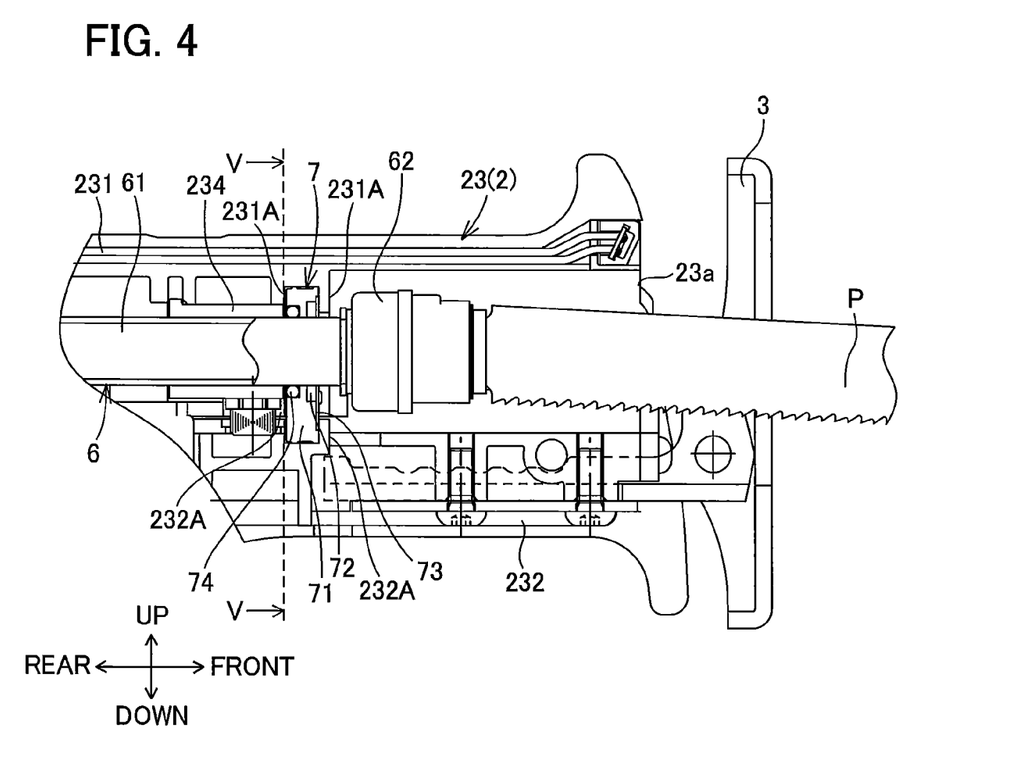
FIG. 4 is a cross-sectional side view illustrating the essential portion of the saber saw according to the embodiment.

As illustrated in FIG. 4, the inner walls of the upper cover 231 and the gear cover 232 include, respectively, fixing walls 231A and 232A for fixing the sealing member 7 described later. A pair of fixing walls 231A protrude downward from the inner wall of the upper cover 231 and are disposed side by side in the frontward/rearward direction. A pair of fixing walls 232A protrude upward from the inner wall of the gear cover 232, and are disposed side by side in the frontward/rearward direction. The fixing walls 231A and 232A abut a front surface and a rear surface of the sealing member 7 so as to fix a position of the sealing member 7 relative to the gear case 23 in the frontward/rearward direction.

A lever 231B is provided at a front portion of a right side surface of the upper cover 231. The lever 231B can be manually operated to attach or remove the blade P.

The base 3 is attached to a front portion of the gear case 23. A workpiece is in abutment with the base 3 during cutting operation. As illustrated in FIGS. 1 and 2, the base 3 is attachable to and detachable from a front end of the gear cover 232.

The motor unit 4 is disposed inside the hollow cylindrical portion 211 of the motor housing 21. As illustrated in FIG. 2, the motor unit 4 includes a motor body 41, a motor shaft 42, a pinion 43, a fan 44, and a control board 45. A combination of the motor body 41 and the motor shaft 42 is an example of "motor" in the present invention.

The motor shaft 42 is generally solid cylindrical in shape, and extends in the frontward/rearward direction of the motor body 41. The motor shaft 42 is rotatably supported by the housing 2 via a bearing 42A and a bearing 42B. The pinion 43 is provided at a front end portion of the motor shaft 42. The pinion 43 rotates coaxially with the motor shaft 42.

The fan 44 is fixed to the motor shaft 42 at a position rearward of the pinion 43. The fan 44 is a centrifugal fan. The fan 44 rotates coaxially with the motor shaft 42. The fan 44 sucks in an outside air through the intake port 211a of the motor housing 21 and discharges an air through the discharge port 211b for cooling the motor body 41 and the control board 45.

The control board 45 is disc-shaped, and is disposed rearward of the motor body 41. A switching element, such as a metal-oxide-semiconductor field-effect transistor (MOSFET) or an insulated-gate bipolar transistor (IGBT), and a Hall element are provided on the control board 45.

As illustrated in FIGS. 2 and 3, the gear unit 5 is housed in the gear case 23 and positioned between the motor unit 4 and the plunger 6. The gear unit 5 is configured to convert a rotary movement of the motor body 41 and the motor shaft 42 into a reciprocating movement in the frontward/rearward direction. As illustrated in FIGS. 2 and 3, the gear unit 5 includes a bevel gear 51, a pin 52, a needle bearing 53, and a connector 54.

The bevel gear 51 is disposed in the gear cover 232 and meshes with the pinion 43 of the motor unit 4. The bevel gear 51 includes a rotating shaft 51A extending in the upward/downward direction orthogonal to the direction of an axis of rotation of the motor shaft 42 of the motor unit 4, that is, the frontward/rearward direction.

The pin 52 is generally solid cylindrical in shape extending in the upward/downward direction. A lower portion of the pin 52 is force-fitted with and fixed to the bevel gear 51 at a position eccentric to the rotating shaft 51A. An upper portion of the pin 52 protrudes upward from an upper surface of the bevel gear 51.

The needle bearing 53 is attached to the upper portion of the pin 52.

The connector 54 is positioned above the pin 52. A guide groove 54a is formed in a lower portion of the connector 54. The guide groove 54a extends in the leftward/rightward direction and is recessed upward. The guide groove 54a has a width in the frontward/rearward direction that is slightly greater than a diameter of the pin 52. The upper portion of the pin 52 is accommodated in the guide groove 54a via the needle bearing 53. The connector 54 regulates a movement of the pin 52 in the frontward/rearward direction and permits the pin to move in the leftward/rightward direction. A semi-cylindrical fixing groove 54b is formed in an upper surface of the connector 54 at generally a middle portion thereof. The fixing groove 54b extends in the frontward/rearward direction and is recessed downward. As will be described later, the connector 54 is fixed to the plunger 6 via the fixing groove 54b.

As illustrated in FIGS. 2 and 3, the plunger 6 includes a plunger body 61 and a blade mounting portion 62. The plunger 6 is an example of "plunger" in the present invention.

The plunger body 61 is generally hollow cylindrical in shape extending in the frontward/rearward direction. The plunger body 61 is reciprocatingly supported by the two bearing metals 234 and 235 in the gear case 23.

The bearing metal 234 is shaped generally like a quadrangular prism extending in the frontward/rearward direction. A cylindrical through-hole 234a penetrates through the bearing metal 234 in the frontward/rearward direction at a center portion thereof. The through-hole 234a has an inner diameter slightly greater than an outer diameter of the plunger body 61. The plunger body 61 extends through the through-hole 234a. The bearing metal 235 has a shape generally identical to that of the bearing metal 234. The plunger body 61 extends through a through-hole 235a.

An annular groove (not illustrated) is formed in a front surface 234A of the bearing metal 234. The annular groove surrounds the through-hole 234a.

The bearing metal 234 is disposed over a frontward outer peripheral surface of the plunger body 61. The bearing metal 235 is disposed over a rearward outer peripheral surface of the plunger body 61. The bearing metals 234 and 235 are pinched and fixed between the upper cover 231 and the gear cover 232. The plunger body 61 is supported by the fixed bearing metals 234 and 235 within the gear case 23, and is reciprocally movable in the frontward/rearward direction.

The connector 54 is fixed to the plunger body 61 at a position between the two bearing metals 234 and 235. The fixing groove 54b in the connector 54 has an inner diameter approximately equal to the outer diameter of the plunger body 61. The connector 54 is bonded and fixed to a lower outer peripheral surface of the plunger body 61 at a position in a rear half of the plunger body 61 in the frontward/rearward direction. Alternatively, the connector 54 and the plunger body 61 may be integrally molded into a single component. The connector 54 is configured to reciprocate along with the plunger body 61 in the frontward/rearward direction.

The blade mounting portion 62 is provided on a front end portion 61A of the plunger body 61. The blade mounting portion 62 is configured such that the blade P can be mounted to a front end of the blade mounting portion 62. The blade mounting portion 62 is an example of "mounting portion", and the blade P is an example of "end bit" in the present invention.

Figure 5:
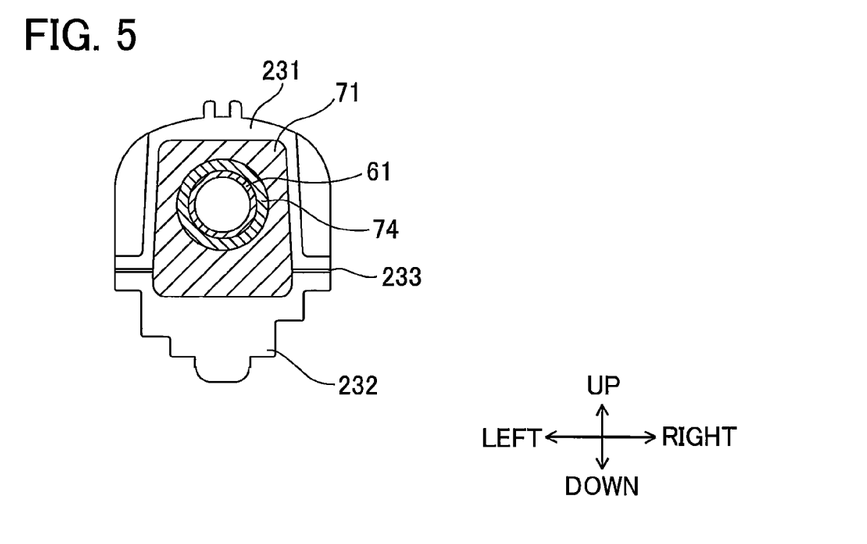
FIG. 5 is a cross-sectional view taken along the line V-V in FIG. 4 illustrating the internal structure of the saber saw according to the embodiment.

As illustrated in FIGS. 2 and 3, the sealing member 7 is disposed between the blade mounting portion 62 and the bearing metal 234. Hereinafter, arrangement of the sealing member 7 will be described with reference to FIGS. 3 to 5. FIG. 4 is a cross-sectional side view illustrating an essential internal structure of the saber saw 1. FIG. 5 is a cross-sectional view taken along the line V-V in FIG. 4.

The sealing member 7 includes an elastic member 71, an annular member 72, a iron plate 73, and an O-ring 74. As illustrated in FIG. 3, the iron plate 73, the annular member 72, the elastic member 71, and the O-ring 74 are disposed in this order in the frontward/rearward direction in the sealing member 7. The sealing member 7 is an example of "sealing member" in the present invention.

The elastic member 71 is formed of elastic material such as rubber and resin. As illustrated in FIGS. 3 and 5, the elastic member 71 has generally trapezoidal shape having a thickness in the frontward/rearward direction. A through-hole 71a penetrates through the elastic member 71 in the frontward/rearward direction at a generally center portion thereof. The through-hole 71a has an inner diameter slightly smaller than the outer diameter of the plunger body 61. The elastic member 71 is elastically deformed to allow the plunger body 61 to pass through the through-hole 71a. Thus, the elastic member 71 is fitted over the plunger body 61. Here, the elastic member 71 makes an intimate contact with an outer peripheral surface of the plunger body 61 by the elastic deformation. A detailed shape of the elastic member 71 will be described later. The elastic member 71 is an example of "main portion" in the present invention.

The annular member 72 is formed of felt impregnated with oil in the present embodiment. As illustrated in FIG. 3, the annular member 72 is shaped like a ring having a thickness in the frontward/rearward direction. A through-hole 72a penetrates through the annular member 72 in the frontward/rearward direction at a generally center portion thereof. The through-hole 72a has an inner diameter approximately equal to the outer diameter of the plunger body 61. The annular member 72 is disposed frontward of the elastic member 71. The annular member 72 is fitted externally onto the plunger body 61 upon insertion of the plunger body 61 in the through-hole 72a. The annular member 72 is an example of "first auxiliary sealing member" in the present invention.

The iron plate 73 is in a form of a thin iron plate. As illustrated in FIG. 3, an upper portion of the iron plate 73 has a semicircular shape, and a lower portion of the iron plate 73 has a rectangular shape. The semicircular portion of the iron plate 73 has an outer diameter slightly greater than an outer diameter of the annular member 72. A through-hole 73a penetrates through the iron plate 73 in the frontward/rearward direction. The through-hole 73a has an inner diameter slightly greater than the outer diameter of the plunger body 61. The iron plate 73 is disposed frontward of the annular member 72. The iron plate 73 is fitted externally onto the plunger body 61 by inserting the plunger body 61 in the through-hole 73a.

The O-ring 74 is formed of elastic material such as rubber and resin. As illustrated in FIG. 3, the O-ring 74 has an annular shape. A through-hole 74a penetrates through the O-ring 74 in the frontward/rearward direction at a generally center portion thereof. The through-hole 74a has an inner diameter slightly smaller than the outer diameter of the plunger body 61. The O-ring 74 is disposed rearward of the elastic member 71. The O-ring 74 is elastically deformed to allow the plunger body 61 to pass through the through-hole 74a. Thus, the O-ring 74 is fitted externally onto the plunger body 61. At this point, the O-ring 74, with its elasticity, makes an intimate contact with the outer peripheral surface of the plunger body 61. The O-ring 74 is an example of "second auxiliary sealing member" in the present invention.

Figures 6A, 6B:
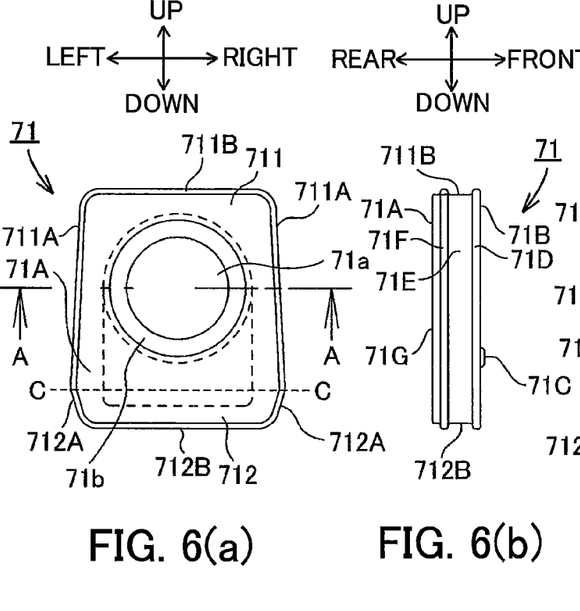
Figure 6C:
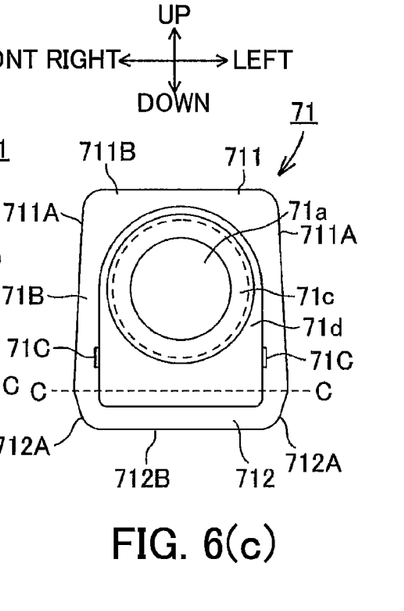
Figure 7A:
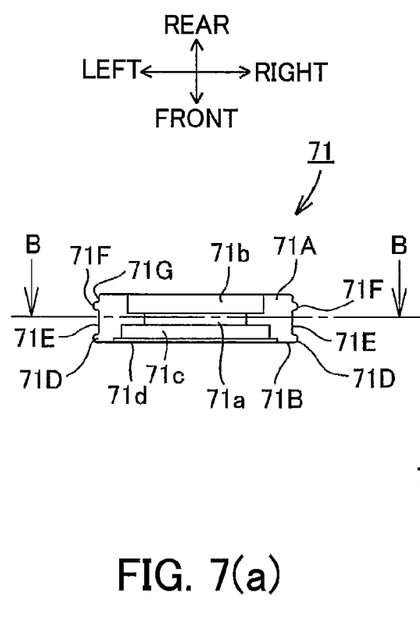
Figure 7B:
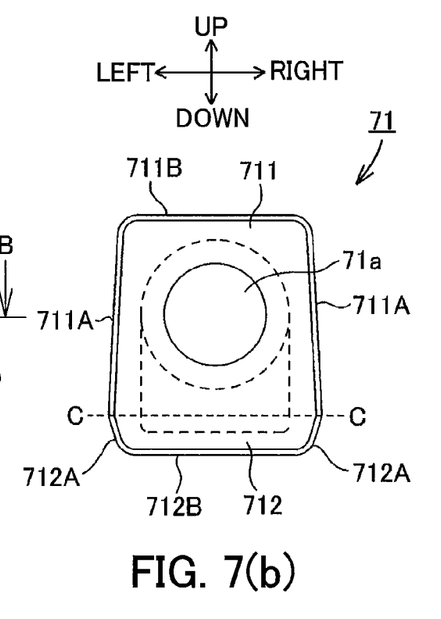

More detailed shape of the elastic member 71 will next be described with reference to FIGS. 6 and 7. FIGS. 6 and 7 illustrate a shape of the elastic member 71. FIGS. 6(a), 6(b), and 6(c) are, respectively, a rear view, a right side view, and a front view of the elastic member 71. FIG. 7(a) is a cross-sectional view taken along the line A-A in in FIG. 6(a). FIG. 7(b) is a cross-sectional view taken along the line B-B in FIG. 7(a).

Arrows shown in the stated drawings indicate the orientation of the elastic member 71 when the elastic member 71 is attached to the gear case 23 (see FIGS. 2, 4, and 5). A broken line C-C in each of FIGS. 6(c) and 7(b) indicates a position corresponding to the parting face of the gear case 23 when the elastic member 71 is attached to the gear case 23. In the following description, the position of the parting face of the gear case 23 will be referred to as a "parting face C". A portion of the elastic member 71 above the parting face C, that is, a portion of the elastic member 71 that is located inside the upper cover 231 when the elastic member 71 is attached to the gear case 23 will be referred to as an "elastic member upper portion 711". Similarly, a portion of the elastic member 71 below the parting face C, that is, a portion of the elastic member 71 that is located inside the gear cover 232 when the elastic member 71 is attached to the gear case 23 will be referred to as an "elastic member lower portion 712".

As illustrated in FIGS. 6(a) to 6(c), the elastic member 71 has a thickness in the frontward/rearward direction. The through-hole 71a penetrates through the elastic member upper portion 711 in the frontward/rearward direction at a generally center portion thereof.

As illustrated in FIGS. 6(a), 6(c), and 7(b), surfaces of the elastic member upper portion 711 that are orthogonal to the frontward/rearward direction each have a generally trapezoidal shape. Specifically, each of right and left side surfaces 711A of the elastic member upper portion 711 is inclined in an inward direction of the upper cover 231 from lower side toward upper side of each of the right and left side surfaces 711A, that is, from the side where the gear cover 232 is located toward the side where the upper cover 231 is located. In other words, the elastic member upper portion 711 has a tapering shape that tapers from the lower side toward the upper side.

Similarly, as illustrated in FIGS. 6(a), 6(c), and 7(b), surfaces of the elastic member lower portion 712 that are orthogonal to the frontward/rearward direction each have a generally trapezoidal shape. Specifically, each of right and left side surfaces 712A of the elastic member lower portion 712 is inclined in an inward direction of the gear cover 232 from upper side toward lower side of each of the right and left side surfaces 712A, that is, from the side where the upper cover 231 is located toward the side where the gear cover 232 is located. In other words, the elastic member lower portion 712 has a tapering shape that tapers from the upper side toward the lower side.

Incidentally, in the present embodiment, the surfaces of the elastic member upper portion 711 that are orthogonal to the frontward/rearward direction have the generally trapezoidal shape, but the present invention is not limited thereto. For example, the stated surfaces may have any shape that tapers from the lower sides toward the upper sides, for example, semicircular shape. Similarly, in the present embodiment, the surfaces of the elastic member lower portion 712 that are orthogonal to the frontward/rearward direction have the generally trapezoidal shape, but the present invention is not limited thereto. For example, the stated surfaces may have any shape that tapers from the upper sides toward the lower sides, for example, semicircular shape. The right and left surfaces 711A of the elastic member upper portion 711, and the right and left surfaces 712A of the elastic member lower portion 712 are examples of "inclined portion", or "first inclined portion", and "second inclined portion".

As illustrated in FIGS. 6(a) and 7(a), a circular ring-shaped groove 71b is formed in a rear surface 71A of the elastic member 71. The groove 71b surrounds the through-hole 71a. This groove 71b has a shape generally identical to that of the circular ring-shaped groove (not illustrated) formed in the front surface 234A of the bearing metal 234. The groove 71b has an inner diameter approximately equal to an outer diameter of the O-ring 74. A sum of a length of the groove 71b in the frontward/rearward direction and a length in the frontward/rearward direction of the groove formed in the front surface 234A of the bearing metal 234 is smaller than or approximately equal to a thickness of the O-ring 74 in the frontward/rearward direction. The groove 71b is an example of "second support portion" or "second groove portion".

As illustrated in FIGS. 6(c) and 7(a), two-stepped grooves 71c and 71d are formed in a front surface 71B of the elastic member 71. The grooves 71c and 71d surround the through-hole 71a.

The groove 71c is formed in a circular ring shape, surrounding the through-hole 71a. The groove 71c has an inner diameter approximately equal to an outer diameter of the annular member 72. The groove 71c has a length in the frontward/rearward direction approximately equal to the thickness of the annular member 72 in the frontward/rearward direction. The groove 71c is an example of "first support portion" or "first groove portion".

The groove 71d surrounds the groove 71c. As illustrated in FIG. 6(c), the groove 71d has a semicircular ring-shaped upper portion surrounding an upper portion of the groove 71c and has a rectangular lower portion surrounding a lower portion of the groove 71c. The groove 71d has a shape generally identical to an outer peripheral shape of the iron plate 73. The groove 71d has a length in the frontward/rearward direction that is approximately equal to a thickness of the iron plate 73 in the frontward/rearward direction.

A pair of projections 71C projecting frontward are provided on the front surface 71B of the elastic member 71. The projections 71C are provided on the right and left sides of the groove 71d. Positions of the projections 71C in the upward/downward direction lie above the parting face C in the present embodiment. Positions of the projections 71C in the leftward/rightward direction lie slightly outside the groove 71d.

An outer peripheral surface of the elastic member 71 includes an upper surface 711B and the right and left side surfaces 711A of the elastic member upper portion 711 as well as the right and left side surfaces 712A and a lower surface 712B of the elastic member lower portion 712. As illustrated in FIGS. 6(b) and 7(a), the outer peripheral surface of the elastic member 71 has a stepped shape. Specifically, the outer peripheral surface of the elastic member 71 includes a first outer peripheral surface 71D, a second outer peripheral surface 71E, a third outer peripheral surface 71F, and a fourth outer peripheral surface 71G arranged in this order from the front side in the frontward/rearward direction. The first outer peripheral surface 71D and the third outer peripheral surface 71F project further outward than the second outer peripheral surface 71E and the fourth outer peripheral surface 71G in the upward/downward direction and in the leftward/rightward direction. The first outer peripheral surface 71D and the third outer peripheral surface 71F have approximately equal lengths in the upward/downward direction, the leftward/rightward direction, and the frontward/rearward direction. The second outer peripheral surface 71E and the fourth outer peripheral surface 71G have approximately equal lengths in the upward/downward direction and the leftward/rightward direction.

Now, a method of attaching the sealing member 7 to the gear case 23 will be described. The sealing member 7 is attached to the plunger body 61 and then fixed to the gear case 23. An attaching method described below is merely an example, and the order in which components are attached may be modified where possible.

The connector 54 is fixed in advance to the plunger body 61. The two bearing metals 234 and 235 and the sealing member 7 are attached to the plunger body 61. At this point, the bearing metal 235 is attached to the plunger body 61 at a position rearward of the connector 54. The bearing metal 234 and the sealing member 7 are attached to the plunger body 61 at respective positions frontward of the connector 54.

The bearing metal 235 is attached to the plunger body 61 by inserting the rear end portion of the plunger body 61 into the through-hole 235a.

The bearing metal 234 is attached to the plunger body 61 by inserting the front end portion 61A of the plunger body 61 into the through-hole 234a. The bearing metal 234 may be attached to the plunger body 61 simultaneously with a portion of the sealing member 7 or simultaneously with the entirety of the sealing member 7.

Thereafter, the O-ring 74 is attached to the front of the bearing metal 234. The O-ring 74 is elastically deformed to expand the through-hole 74a, and the front end portion 61A of the plunger body 61 is inserted into the through-hole 74a. The O-ring 74 is disposed such that a rear portion of the O-ring 74 is fitted in the groove (not illustrated) provided in the front surface 234A of the bearing metal 234. The O-ring 74 is thus attached to the plunger body 61 with the rear portion of the O-ring 74 supported by the bearing metal 234. At this point, since the inner diameter of the through-hole 74a in the O-ring 74 is smaller than the outer diameter of the plunger body 61, the O-ring 74, with its elasticity, makes a tight contact with the outer peripheral surface of the plunger body 61.

Then, the elastic member 71 is attached to the front of the O-ring 74. The elastic member 71 is elastically deformed to expand the through-hole 71a, and the front end portion 61A of plunger body 61 is inserted into the through-hole 71a from the side of the rear surface 71A. The elastic member 71 is attached to the plunger body 61 with a front portion of the O-ring 74 fitted in the groove 71b provided in the rear surface 71A of the elastic member 71. At this point, the front portion of the O-ring 74 is supported by the groove 71b of the elastic member 71. Since the inner diameter of the through-hole 71a of the elastic member 71 is smaller than the outer diameter of the plunger body 61, the elastic member 71, with its elasticity, makes a tight contact with the outer peripheral surface of the plunger body 61.

Next, the annular member 72 is attached to the front surface 71B of the elastic member 71. The front end portion 61A of the plunger body 61 is inserted into the through-hole 72a of the annular member 72. The annular member 72 is thus fitted into the groove 71c provided in the front surface 71B of the elastic member 71. The annular member 72 is attached to the plunger body 61 with the rear surface of the annular member 72 supported by the groove 71c.

Thereafter, the iron plate 73 is attached to the front of the annular member 72. The front end portion 61A of the plunger body 61 is inserted into the through-hole 73a of the iron plate 73. The iron plate 73 is thus fitted into the groove 71d provided in the front surface 71B of the elastic member 71. The iron plate 73 is attached to the plunger body 61 with a rear surface of the iron plate 73 supported by the groove 71d and the annular member 72. At this point, the projections 71C provided on the front surface 71B of the elastic member 71 regulate movement of the iron plate 73 relative to the elastic member 71, that is, keep the iron plate 73 from shifting or floating relative to the elastic member 71. Thus, the projections 71C fix position of the iron plate 73.

In this manner, the bearing metals 234 and 235 and the sealing member 7 are attached to the plunger body 61. Incidentally, the sealing member 7 may be attached to the plunger body 61 after the O-ring 74, the annular member 72, and the iron plate 73 are attached to the elastic member 71. In the latter case, the integrated sealing member 7 can be attached to the plunger body 61, enhancing assemblability.

The plunger body 61 is attached to the gear case 23, after the bearing metals 234 and 235 and the sealing member 7 are attached to the plunger body 61. In the case described below, the plunger body 61 is attached first to the upper cover 231. Alternatively, the plunger body 61 may be attached first to the gear cover 232, and this unit may then be attached to the upper cover 231. The blade mounting portion 62 is attached to the front end portion 61A of the plunger body 61 before, while, or after the plunger body 61 is attached to the gear case 23, but description thereof will be omitted.

The plunger body 61 is attached to the upper cover 231 such that the sealing member 7 is disposed between the two fixing walls 231A and the bearing metals 234 and 235 are disposed at predetermined fixing positions.

The sealing member 7 is inserted into a space between the fixing walls 231A such that the upper surface 711B of the elastic member 71 is a leading end in the insertion. The elastic member 71 has the tapering shape in which distance between the right and left side surfaces 711A of the elastic member upper portion 711 are decreased toward the upper surface 711B. Therefore, the elastic member 71 can be easily inserted into the space between the fixing walls 231A provided in the upper cover 231 having the semi-cylindrical shape. Attachment of the plunger body 61 to the upper cover 231 is completed upon positioning the elastic member upper portion 711 in the upper cover 231.

Then, the upper cover 231 to which the plunger body 61 is attached is attached to the gear cover 232. Prior to attaching the upper cover 231, the bevel gear 51 to which the pin 52 is attached is disposed in the groove 232a of the gear cover 232.

While the oil sheet 233 is disposed on the parting face of the gear cover 232, the upper cover 231 is disposed such that the parting face of the upper cover 231 opposes the parting face of the gear cover 232 with the oil sheet 233 interposed therebetween. At this point, attaching positions of the upper cover 231 and the gear cover 232 are adjusted such that the sealing member 7 is disposed between the two fixing walls 232A, the bearing metals 234 and 235 are disposed at predetermined fixing positions, and the upper portion of the pin 52 is positioned in the guide groove 54a of the connector 54 via the needle bearing 53.

The sealing member 7 is inserted into a space between the fixing walls 232A such that the lower surface 712B of the elastic member 71 is a leading end in the insertion. The elastic member 71 has the tapering shape in which the distance between the right and left side surfaces 712A of the elastic member lower portion 712 is decreased toward the lower surface 712B. Therefore, the elastic member 71 can be easily inserted into the space between the fixing walls 232A provided in the gear cover 232 having the semi-cylindrical shape, in a manner similar to the insertion of the elastic member into the upper cover 231. The upper cover 231 is fixed to the gear cover 232 by threads, while the elastic member lower portion 712 is disposed in the gear cover 232 and the parting faces of the gear cover 232 and the upper cover 231 are connected to each other with the oil sheet 233 being interposed therebetween. Thus, attachment of the plunger 6 and the sealing member 7 to the gear case 23 is completed.

Position of the sealing member 7 in the frontward/rearward direction is fixed by the fixing walls 231A and the fixing walls 232A in the gear case 23, and the sealing member 7 is nipped between the inner surface of the upper cover 231 and the inner surface of the gear cover 232, whereby the sealing member 7 is fixed to the gear case 23. At this point, the elastic member 71 and the O-ring 74 of the sealing member 7 make a tight contact with the outer peripheral surface of the plunger body 61. Thus, the sealing member 7 seals any gaps between the gear case 23 and the plunger body 61.

As described above, in the saber saw 1 according to the present embodiment, the sealing member 7 pinched by the gear case 23 is configured to seal the outer peripheral surface of the plunger body 61. Thus, the sealing member 7 can prevent any dust or liquid entering the gear case 23 through the opening 23a from moving past the bearing metal 234. Accordingly, the dustproof property and the waterproof property of the interior of the gear case 23 inward of the fixing position of the bearing metal 234 can be improved, and thus an occurrence of a problem, such as damage to the gear unit 5 and the motor unit 4, can be prevented. In addition, entry of dust or liquid from the outside of the gear case 23 into the gear case 23 along the plunger body 61 can be restrained, and leakage of oil from the gear case 23 to the outside of the gear case along the plunger body can be restrained. Thus, occurrence of a problem, such as lowering in slidability of the plunger body 61, lowering in operability, or damage to the gear unit 5 and the motor unit 4, can be prevented, and the performance of the tool can be maintained favorably.

The sealing member 7 is pinched by and fixed to the gear case 23. Thus, there is no need to provide a separate component for fixing the sealing member 7. Thus, increase in numbers of components or in the number of assembly steps can be suppressed. Thus, the dustproof property and the waterproof property of the tool can be ensured with reduced cost, and the size of the tool body can be reduced.

The sealing member 7 includes the elastic member 71 and the O-ring 74 that are elastic. Thus, this elasticity helps the sealing member 7 make a tight contact with the outer peripheral surface of the plunger body 61, and the blocking property of the outer peripheral surface of the plunger body 61 improves. The annular member 72 made of felt and the iron plate 73 are disposed frontward of the elastic member 71. Thus, even in a case where high-temperature iron powder or liquid enters the gear case 23 through the opening 23a, deformation of the sealing member 7 can be prevented, and lowering in dustproof property and waterproof property can be prevented. Further, oil can be impregnated into the felt of the annular member 72. Thus, enhanced slidability of the O-ring 74 and the elastic member 71 relative to the plunger body 61 can be obtained.

Further, the grooves 71b, 71c, and 71d configured to support the O-ring 74, the annular member 72, and the iron plate 73 are formed in the elastic member 71. The front portion of the O-ring 74 is fitted in the groove 71b. The annular member 72 and the iron plate 73 are fitted entirely in the grooves 71c and 71d. Thus, the length of the sealing member 7 in the frontward/rearward direction can be reduced without compromising the dustproof property and the waterproof property. Accordingly, the size of the tool body can be reduced. The rear portion of the O-ring 74 is supported by the front surface of the bearing metal 234. Thus, release of the sealing member 7 from the plunger body 61 can be prevented.

Thus far, the present invention has been described on the basis of embodiments. The present invention, however, is not limited the embodiments described above, and various changes can be made without departing from the spirit of the present invention. Hereinafter, some modifications will be described.

Figure 8:
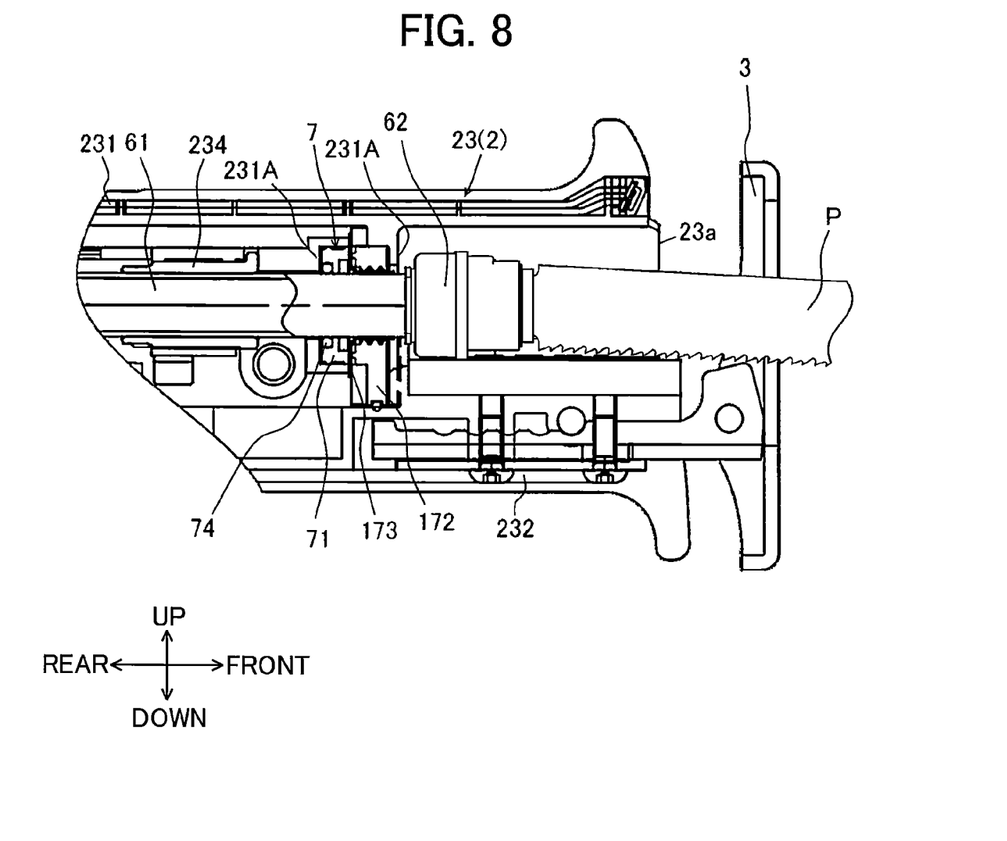
FIG. 8 is a cross-sectional view illustrating an internal structure of an essential portion of a saber saw according to a modification to the embodiment of the present invention.

FIG. 8 is a cross-sectional side view illustrating an inner structure of an essential portion of according to a modification to the embodiment of the present invention. In FIG. 8, like parts and components are designated by the same reference numerals as those shown in the above-described embodiment to avoid duplicating description. According to the modification, the annular member 72 and the iron plate 73 are removed from the foregoing embodiment. Instead, a large-sized elastic sealing member 172 is provided, and a large-sized steel plate 173 is provided between the elastic member 71 and the elastic sealing member 172. The steel plate 173 is configured to prevent two adjacent elastic members, i.e., the elastic member 71 and the elastic sealing member 172 from coming into contact with each other. In this manner, in place of the annular member 72 that can be held by the elastic member 71, the large-sized elastic sealing member 172 and the elastic member 71 may be pinched by the gear case 23. In this case, the elastic sealing member 172 that is relatively large and has a high design flexibility allows dustproof performance and waterproof performance to be adjusted as appropriate.

Thus far, a saber saw has been described as an example of the reciprocating tool in the present embodiment, but the present invention is not limited thereto. For example, the present invention can also be applied to a jigsaw configured to reciprocate an end bit mounted on a plunger.

Further, in the foregoing embodiments, the gear case 23 is formed as complementary halves that is split along the parting face orthogonal to the upward/downward direction, but the present invention is not limited thereto. For example, the gear case 23 may be formed as complementary halves that are split along a parting face orthogonal to the leftward/rightward direction.

Further, in the foregoing embodiments, the elastic member 71 and the O-ring 74 are separate members, but the elastic member 71 and the O-ring 74 may be formed as a single member. In the latter case, a circular ring portion corresponding to the O-ring 74 and made from material the same as the O-ring 74 is provided at a portion where the groove 71b is provided in the elastic member 71, and this ring portion is molded integrally with the elastic member 71. The O-ring 74 does not need to be made of a material identical to that of the elastic member 71, as long as the O-ring 74 is formed of an elastic material. In place of the O-ring 74, a circular ring-shaped member, such as an X-ring and a V-ring, that is elastic and that makes a tight contact with the outer peripheral surface of the plunger body 61 may be provided.

REFERENCE SIGNS LIST

1: saber saw, 4: motor unit, 5: gear unit, 6: plunger, 7: sealing member, 23: ger case, 41: motor body, 42: motor shaft, 61: plunger body, 62: blade mounting portion, 71: elastic member, 71b, 71c, 71d: groove, 72: annular member, 73: steel plate, 74: O-ring, 231: upper cover, 232: gear cover, 234, 235: bearing metal, 711: elastic member upper portion, 711A: side surface, 712 elastic member lower portion, 712A: side surface, P: blade

The invention claimed is:

1. A reciprocating tool comprising:
a motor;
a casing having a first part and a second part facing the first part;
a converting mechanism accommodated in the casing and configured to convert rotating motion of the motor into reciprocating movement in a predetermined direction;
a plunger provided with a mounting portion on which an end bit is mountable, the plunger being reciprocally movably supported to the casing and being driven by the conveying mechanism to reciprocally move in the predetermined direction;
a bearing portion positioned in the casing and configured to reciprocally movably support the plunger in the predetermined direction;
a first sealing member into which the plunger is reciprocally movably inserted in the predetermined direction, the first sealing member being nipped between the first part and the second part and being positioned between the mounting portion and the bearing portion in the predetermined direction; and
a second sealing member supported by the first sealing member and contacting an outer peripheral surface of the plunger,
wherein the first sealing member includes an inclined portion inclined with respect to a direction from the first part toward the second part, and
wherein the inclined portion includes a first inclined portion and a second inclined portion, the first inclined portion being positioned closer to the first part than the second inclined portion is to the first casing and having a tapered shape in a direction from the second part toward the first part, the second inclined portion being positioned closer to the second part than the first inclined portion is to the second part and having a tapered shape in the direction from the first part toward the second part.

2. A reciprocating tool comprising:
a motor;
a casing;
a converting mechanism accommodated in the casing and configured to convert rotating motion of the motor into reciprocating movement in a front-rear direction;
a plunger provided with a mounting portion on which an end bit is mountable and reciprocally movable supported to the casing, the plunger being driven by the converting mechanism to reciprocally move in the front-rear direction;
a first sealing member into which the plunger is reciprocally movably inserted in the front-rear direction, the first sealing member being supported by the casing and being elastically deformable;
a second sealing member supported by the first sealing member, the second sealing member being elastically deformable and contacting an outer peripheral surface of the plunger; and
a third sealing member supported by the first sealing member, the third sealing member being elastically deformable and contacting the outer peripheral surface of the plunger,
wherein the first sealing member has a first groove portion formed in a front side of the first sealing member and a second groove portion formed in a rear side of the first sealing member; and
wherein the second sealing member is positioned in the first groove portion, and the third sealing member is positioned in the second groove portion.

3. The reciprocating tool according to claim 2, wherein the casing comprises a first part and a second part, the first part and the second part being assembled into the casing, the first sealing member being nipped between the first part and the second part.

4. The reciprocating tool according to claim 3, wherein the first sealing member includes an inclined portion inclined with respect to a direction from the first part toward the second part, and
wherein the inclined portion includes a first inclined portion and a second inclined portion, the first inclined portion being positioned closer to the first part than the second inclined portion is to the first part and having a tapered shape in a direction from the second part toward the first part, the second inclined portion being positioned closer to the second part than the first inclined portion is to the second part and having a tapered shape in the direction from the first part toward the second part.

5. The reciprocating tool according to claim 3, further comprising:
a bearing portion positioned in the casing and configured to support the plunger reciprocally movably in the front-rear direction,
wherein the first sealing member comprises a main body portion, the second sealing member being positioned closer to the mounting portion than the main body portion is to the mounting portion in the front-rear direction, the third sealing member being positioned closer to the bearing portion than the main body portion is to the bearing portion in the front-rear direction, the main body portion being nipped between the first part and the second part.

6. The reciprocating tool according to claim 5, wherein the main body portion includes a first support portion supporting the second sealing member, and a second support portion supporting the third sealing member.

7. The reciprocating tool according to claim 6, wherein the main body portion has one surface facing the mounting portion, and another surface facing the bearing portion, the first support portion being the first groove portion formed in the one surface, the second support portion being the second groove portion formed in the another surface.

8. The reciprocating tool according to claim 5, wherein the second sealing member is annular in shape and formed of felt.

9. The reciprocating tool according to claim 2, wherein the mounting portion is disposed on a front end of the plunger.

10. The reciprocating tool according to claim 9, wherein the first sealing member is formed with a hole into which the plunger is reciprocally movably inserted in the front-rear direction, the hole having a first portion and a second portion disposed rearward of the first portion, an inner diameter of the second portion being larger than an inner diameter of the first portion, wherein the second portion directly supports the second sealing member, and wherein the second sealing member is restricted from moving frontward by the first portion.

11. The reciprocating tool according to claim 10, wherein the hole has a third portion disposed frontward of the first portion, an inner diameter of the third portion being larger than the inner diameter of the first portion, and wherein the third sealing member is supported by an inner surface of the third portion and is restricted from moving rearward by the first portion.

12. The reciprocating tool according to claim 9, further comprising a plate disposed frontward of the second sealing member, wherein the first sealing member has a groove in which the plate is disposed.

13. The reciprocating tool according to claim 2, wherein the first sealing member is formed with a hole into which the plunger is reciprocally movably inserted in the front-rear direction, and has an inner surface defining the hole and supporting the second sealing member, and wherein the second sealing member has an outer peripheral surface having a first length in the front-rear direction, and the inner surface of the first sealing member has a second length in the front-rear direction, the second length being greater than the first length.

14. The reciprocating tool according to claim 2, wherein the first sealing member is formed with a hole into which the plunger is reciprocally movably inserted in the front-rear direction, and has an inner surface defining the hole and supporting the second sealing member, and wherein the second sealing member has an outer peripheral surface having a first length in the front-rear direction, a part of the outer peripheral surface being in contact with the inner surface of the first sealing member, the part of the outer peripheral surface having a second length in the front-rear direction, the second length being greater than a half of the first length.

15. The reciprocating tool according to claim 2, wherein the first sealing member is formed with a hole into which the plunger is reciprocally movably inserted in the front-rear direction, and has an inner surface defining the hole and supporting the second sealing member, and wherein the second sealing member has an outer peripheral surface, entirety of the outer peripheral surface being in contact with the inner surface of the first sealing member in the front-rear direction.

16. The reciprocating tool according to claim 2, wherein the first sealing member is formed with a hole into which the plunger is reciprocally movably inserted in the front-rear direction, and has an inner surface defining the hole and supporting the second sealing member, wherein the first sealing member comprises a wall portion protruding from the inner surface in a radial direction perpendicular to the front-rear direction, the wall portion having a distal end in the radial direction, and wherein the second sealing member has an outer peripheral surface, a part of the outer peripheral surface being positioned between the distal end of the wall portion and the inner surface of the first sealing member in the radial direction.

* * * * *